(12) United States Patent
Reyes et al.

(10) Patent No.: US 9,217,335 B2
(45) Date of Patent: Dec. 22, 2015

(54) FIXTURE AND METHOD FOR ADJUSTING WORKPIECE

(75) Inventors: Eunice D. Reyes, Weslaco, TX (US); Javier Garza, Mission, TX (US); Charles Van Buchan, Greer, SC (US); Blake Allen Fulton, Simpsonville, SC (US); Steven Charles Woods, Easley, SC (US); Mark Carmine Bellino, Greenville, SC (US)

(73) Assignee: General Electric Company, Schanectedy, NY (US)

( * ) Notice: Subject to any disclaimer, the term of this patent is extended or adjusted under 35 U.S.C. 154(b) by 800 days.

(21) Appl. No.: 13/467,308

(22) Filed: May 9, 2012

(65) Prior Publication Data

US 2013/0298369 A1    Nov. 14, 2013

(51) Int. Cl.
| | |
|---|---|
| B25B 27/14 | (2006.01) |
| F01D 9/02 | (2006.01) |
| B23Q 3/06 | (2006.01) |
| B23Q 3/18 | (2006.01) |
| B25B 5/10 | (2006.01) |
| B25B 11/02 | (2006.01) |
| F01D 25/28 | (2006.01) |

(52) U.S. Cl.
CPC ............... *F01D 9/023* (2013.01); *B23Q 3/062* (2013.01); *B23Q 3/183* (2013.01); *B23Q 3/186* (2013.01); *B25B 5/105* (2013.01); *B25B 5/106* (2013.01); *B25B 5/107* (2013.01); *B25B 11/02* (2013.01); *F01D 25/285* (2013.01); *Y10T 29/4978* (2015.01); *Y10T 29/49902* (2015.01); *Y10T 29/5367* (2015.01); *Y10T 29/53087* (2015.01); *Y10T 29/53978* (2015.01)

(58) Field of Classification Search
USPC ........................................................ 29/281.1
See application file for complete search history.

(56) References Cited

U.S. PATENT DOCUMENTS

| | | | | |
|---|---|---|---|---|
| 1,336,755 A | * | 4/1920 | Parmelee | 269/96 |
| 1,395,566 A | * | 11/1921 | Fluhr | 269/91 |
| 1,473,946 A | * | 11/1923 | Amsden et al. | 269/4 |
| 1,676,289 A | * | 7/1928 | Schmalz | 269/93 |
| 1,995,206 A | * | 3/1935 | Geissbuhler | 269/94 |

(Continued)

FOREIGN PATENT DOCUMENTS

| | | | | |
|---|---|---|---|---|
| DE | 19846371 A1 | * | 4/2000 | ............... B25B 5/14 |
| EP | 1870192 A1 | | 12/2007 | |

(Continued)

OTHER PUBLICATIONS

Search Report and Written Opinion from EP Application No. 13167179.4 dated Jul. 29, 2013.

(Continued)

*Primary Examiner* — Lee D Wilson
*Assistant Examiner* — Alvin Grant
(74) *Attorney, Agent, or Firm* — Dority & Manning, P.A.

(57) ABSTRACT

A fixture and method for adjusting a workpiece are disclosed. The fixture includes a holding device engageable to a workpiece to secure the workpiece, and an adjustment device engageable to a projecting member of the workpiece and movable along a first axis and a second axis. Movement of the adjustment device along the first axis when engaged to the projecting member adjusts the projecting member along the first axis, and movement of the adjustment device along the second axis when engaged to the projecting member adjusts the projecting member along the second axis.

20 Claims, 8 Drawing Sheets

(56) References Cited

U.S. PATENT DOCUMENTS

| | | | | |
|---|---|---|---|---|
| 2,061,718 | A * | 11/1936 | Stahl | 269/232 |
| 2,325,387 | A * | 7/1943 | Fredrickson | 269/94 |
| 2,466,518 | A * | 4/1949 | Wagner | 269/91 |
| 2,487,022 | A * | 11/1949 | La Placa | 269/92 |
| 2,619,010 | A * | 11/1952 | Mathison | 269/93 |
| 2,672,790 | A * | 3/1954 | Carroll | 269/93 |
| 2,913,965 | A * | 11/1959 | Collis | 269/93 |
| 3,210,069 | A * | 10/1965 | Holtz | 269/94 |
| 3,227,438 | A * | 1/1966 | Sequin | 269/94 |
| 3,677,424 | A * | 7/1972 | Anderson | 414/550 |
| 3,971,485 | A * | 7/1976 | Hoppey | 414/420 |
| 4,037,670 | A * | 7/1977 | Atherton et al. | 172/795 |
| 4,397,497 | A * | 8/1983 | Alonzo et al. | 296/165 |
| 4,408,942 | A * | 10/1983 | Butler et al. | 414/24.5 |
| 4,432,538 | A * | 2/1984 | Sequin | 269/92 |
| 4,660,816 | A * | 4/1987 | Taylor | 269/238 |
| 4,792,129 | A * | 12/1988 | LePrevost, Jr. | 269/46 |
| 4,792,268 | A * | 12/1988 | Smith | 410/9 |
| 4,890,798 | A * | 1/1990 | Tagawa et al. | 241/266 |
| 5,114,283 | A * | 5/1992 | Fulton | 408/103 |
| 5,135,205 | A * | 8/1992 | Bedard | 269/17 |
| 5,267,462 | A * | 12/1993 | Pijanowski | 72/392 |
| 5,342,031 | A * | 8/1994 | Yu-Fang | 269/134 |
| 5,356,124 | A * | 10/1994 | Ai | 269/134 |
| 5,573,229 | A | 11/1996 | Lycan | |
| 5,798,021 | A * | 8/1998 | Stiles | 156/556 |
| 5,971,378 | A * | 10/1999 | Sweeney | 269/6 |
| 6,095,744 | A * | 8/2000 | Harrison | 414/408 |
| 7,004,682 | B1 * | 2/2006 | Moody | 405/184.4 |
| 7,051,661 | B2 * | 5/2006 | Herzog et al. | 105/286 |
| 7,207,203 | B2 | 4/2007 | Corn | |
| 7,503,134 | B2 * | 3/2009 | Buckner | 37/317 |
| 7,506,910 | B2 * | 3/2009 | Leitner et al. | 296/68 |
| 2003/0234479 | A1 * | 12/2003 | Brass et al. | 269/97 |
| 2005/0135915 | A1 * | 6/2005 | Hall | 414/739 |
| 2008/0006400 | A1 * | 1/2008 | Coyle | 166/77.1 |
| 2008/0087154 | A1 * | 4/2008 | Takakura | 83/523 |
| 2011/0001022 | A1 * | 1/2011 | Edinger | 248/103 |

FOREIGN PATENT DOCUMENTS

| | | | | |
|---|---|---|---|---|
| EP | 1920988 A1 * | 5/2008 | | B61B 12/00 |
| FR | 2593422 A1 * | 7/1987 | | B25B 5/10 |
| FR | 2631099 A1 | 11/1989 | | |

OTHER PUBLICATIONS

European Office Action issued in connection with corresponding EP Application No. 13167179.4 dated Sep. 9, 2015.

* cited by examiner

FIXTURE AND METHOD FOR ADJUSTING WORKPIECE

FIELD OF THE INVENTION

The present disclosure relates in general to fixtures and methods for adjusting workpieces, such as in exemplary embodiments transition pieces, and more specifically to fixtures and methods for adjusting projecting members of the workpieces along multiple axes.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The hot gas flow provided from the combustor section to the turbine section is typically flowed through a transition piece. The transition piece is a component of the combustor section that may change the geometry and direction of the hot gas path through which the hot gas is flowed. Thus, the transition piece typically includes a forward end having a first cross-sectional shape and size, and an aft end having a second cross-sectional shape and size.

During operation of the turbine system, the transition piece is subjected to a variety of forces. Various components of the transition piece may thus become misaligned during operation. For example, the mounting brackets which mount the transition piece in the combustor section may be forced out of alignment. Such alignment within the appropriate specifications and with respect to other components of the transition piece is critical for the transition piece to be properly positioned in the combustor section, so that for example the transition piece is mounted properly and various seals are maintained. Further, when new transition pieces are manufactured, it is similarly critical that the mounting brackets are properly aligned before the transition piece is utilized in a turbine system.

Transition pieces are one example of workpieces with components that may require adjustment in multiple directions. Many such workpieces include projecting members which may require such adjustment relative to other components of the workpieces.

Currently known methods and apparatus for such adjustments involve manually adjusting the projecting members, such as the mounting brackets of transition pieces. For example, mallets may be utilized to hammer the projecting members in various directions. After a period of hammering, the location of the projecting member may be assessed, and further hammering commenced as required. Such methods and apparatus are inaccurate and inefficient.

Accordingly, improved fixtures and methods for adjusting workpieces are desired in the art. For example, fixtures and methods that accurately and efficiently adjust projecting members of workpieces along multiple axes would be advantageous.

BRIEF DESCRIPTION OF THE INVENTION

Aspects and advantages of the invention are set forth below in the following description, or may be obvious from the description, or may be learned through practice of the invention.

In one embodiment, a fixture for adjusting a transition piece is disclosed. The fixture includes a holding device engageable to the transition piece to secure the transition piece, and an adjustment device engageable to a mounting bracket of the transition piece and movable along a first axis and a second axis. Movement of the adjustment device along the first axis when engaged to the mounting bracket adjusts the mounting bracket along the first axis relative to an aft frame of the transition piece, and movement of the adjustment device along the second axis when engaged to the mounting bracket adjusts the mounting bracket along the second axis relative to the aft frame.

In another embodiment, a fixture for adjusting a workpiece is disclosed. The fixture includes a holding device engageable to a workpiece to secure the workpiece, and an adjustment device engageable to a projecting member of the workpiece and movable along a first axis and a second axis. Movement of the adjustment device along the first axis when engaged to the projecting member adjusts the projecting member along the first axis, and movement of the adjustment device along the second axis when engaged to the projecting member adjusts the projecting member along the second axis.

In another embodiment, a method for adjusting a workpiece is disclosed. The method includes securing the workpiece such that the workpiece is generally fixed, and engaging a projecting member of the workpiece with an adjustment device. The method further includes moving the adjustment device along at least one of a first axis or a second axis to adjust the projecting member along the at least one of the first axis or the second axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
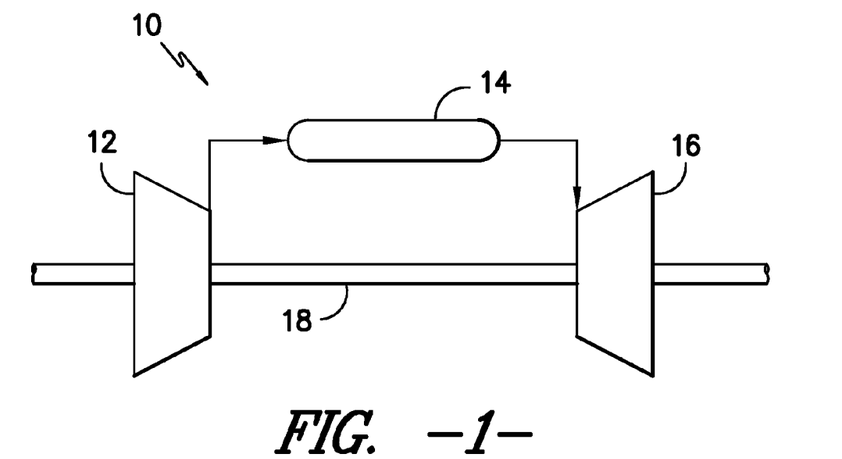
FIG. 1 is a schematic view of a gas turbine system according to one embodiment of the present disclosure.

FIG. 1 is a schematic diagram of a gas turbine system 10. It should be understood that the turbine system 10 of the present disclosure need not be a gas turbine system 10, but rather may be any suitable turbine system 10, such as a steam turbine system or other suitable system. The gas turbine system 10 may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. Exhaust gases from the system 10 may be exhausted into the atmosphere, flowed to a steam turbine or other suitable system, or recycled through a heat recovery steam generator.

Figure 2:
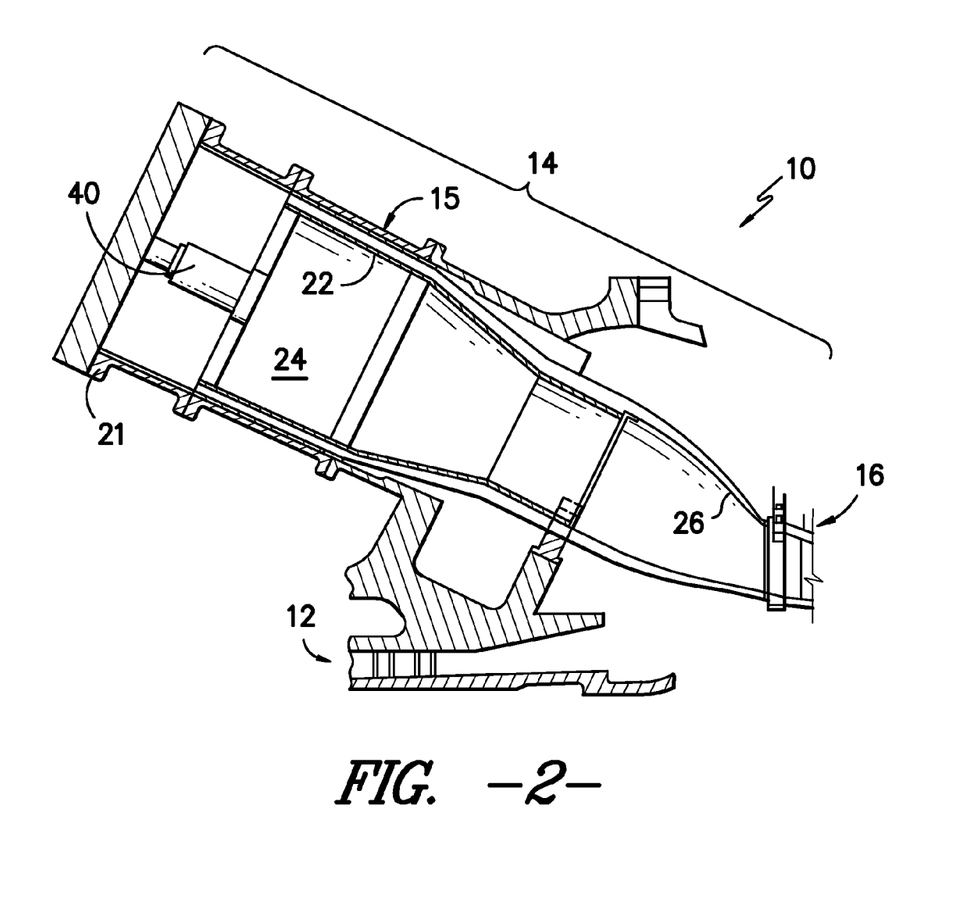
FIG. 2 is a cross-sectional view of several portions of a gas turbine system according to one embodiment of the present disclosure.

Referring to FIG. 2, a simplified drawing of several portions of a gas turbine system 10 is illustrated. The gas turbine system 10 as shown in FIG. 2 comprises a compressor section 12 for pressurizing a working fluid that is flowing through the system 10. The working fluid is typically air, but may be any suitable liquid or gas. Pressurized working fluid discharged from the compressor section 12 flows into a combustor section 14, which may include a plurality of combustors 15 (only one of which is illustrated in FIG. 2) disposed in an annular array about an axis of the system 10. The working fluid entering the combustor section 14 is mixed with fuel, such as natural gas or another suitable liquid or gas, and combusted. Hot gases of combustion flow from each combustor 15 to a turbine section 16 to drive the system 10 and generate power.

A combustor 15 in the gas turbine 10 may include a variety of components for mixing and combusting the working fluid and fuel. For example, the combustor 15 may include a casing 21, such as a compressor discharge casing 21. A variety of sleeves may be at least partially disposed in the casing 21. For example, a combustor liner 22 may generally define a combustion zone 24 therein. Combustion of the working fluid, fuel, and optional oxidizer may generally occur in the combustion zone 24. The resulting hot gases of combustion may flow downstream through the combustion liner 22 into a transition piece 26 which further defines the combustion zone, and then flow through the transition piece 26 and into the turbine section 16.

The combustor 15 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

Figure 3:
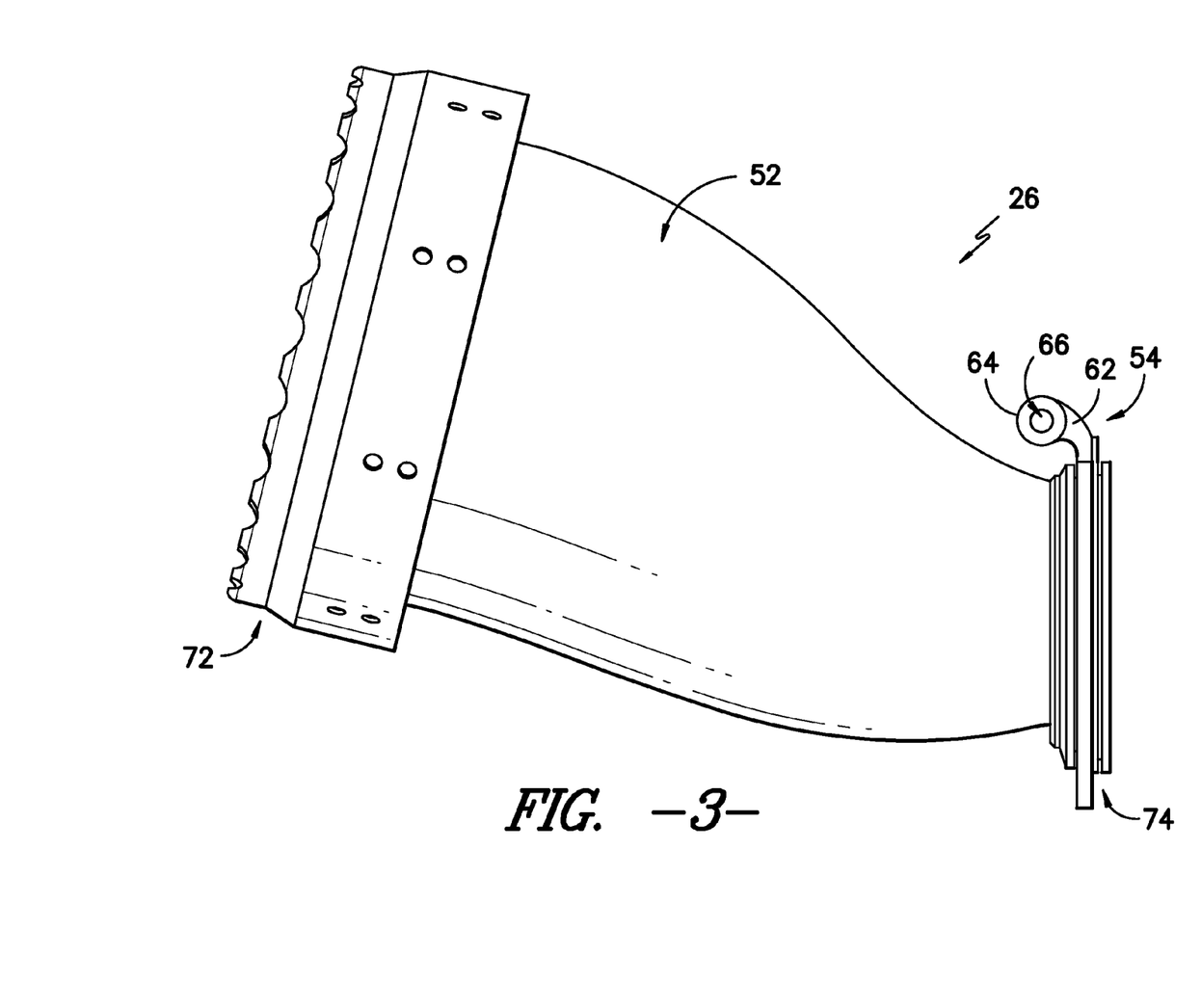
FIG. 3 is a side view of a transition piece according to one embodiment of the present disclosure.
Figure 4:
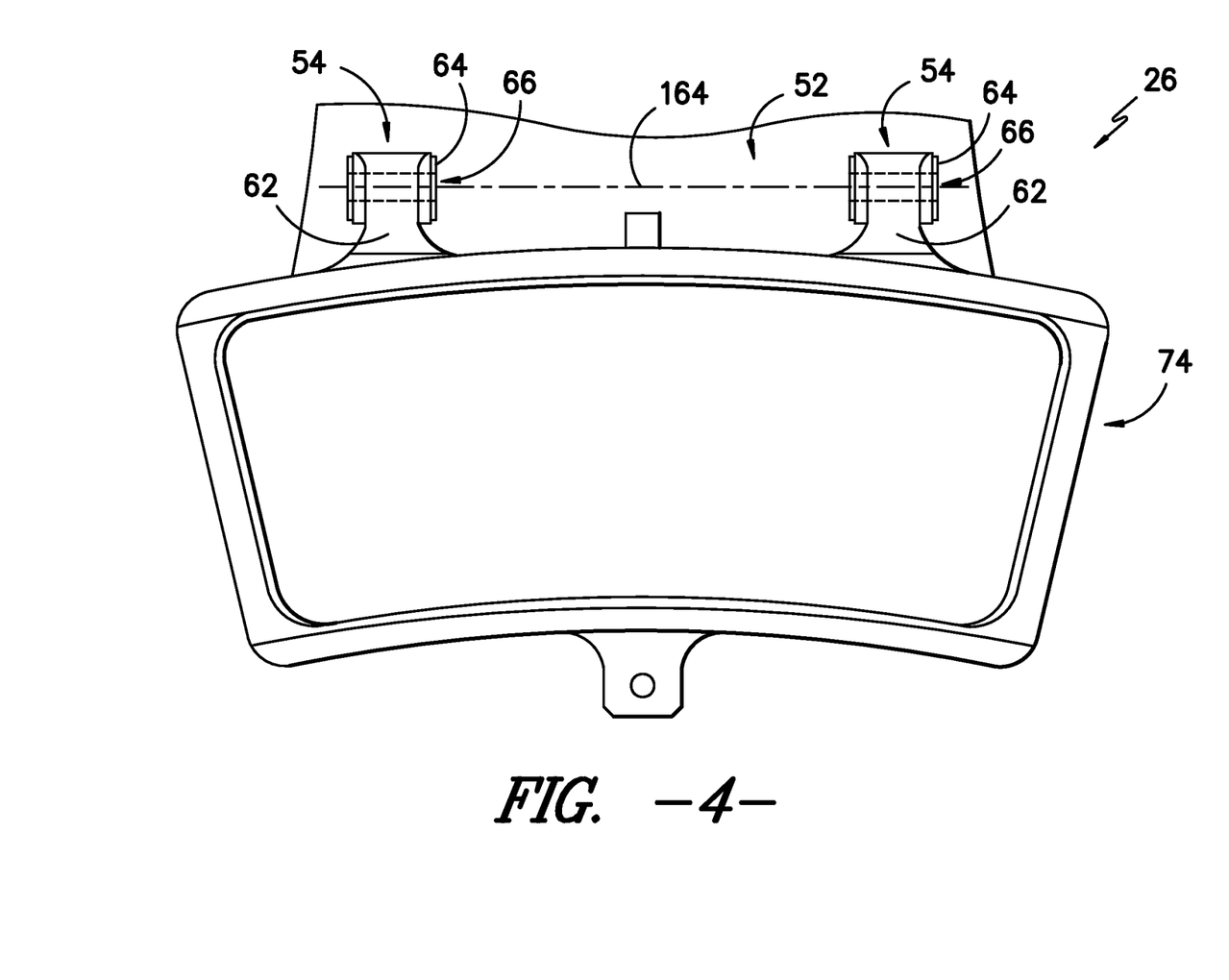
FIG. 4 is a rear view of a transition piece according to one embodiment of the present disclosure.
Figure 5:
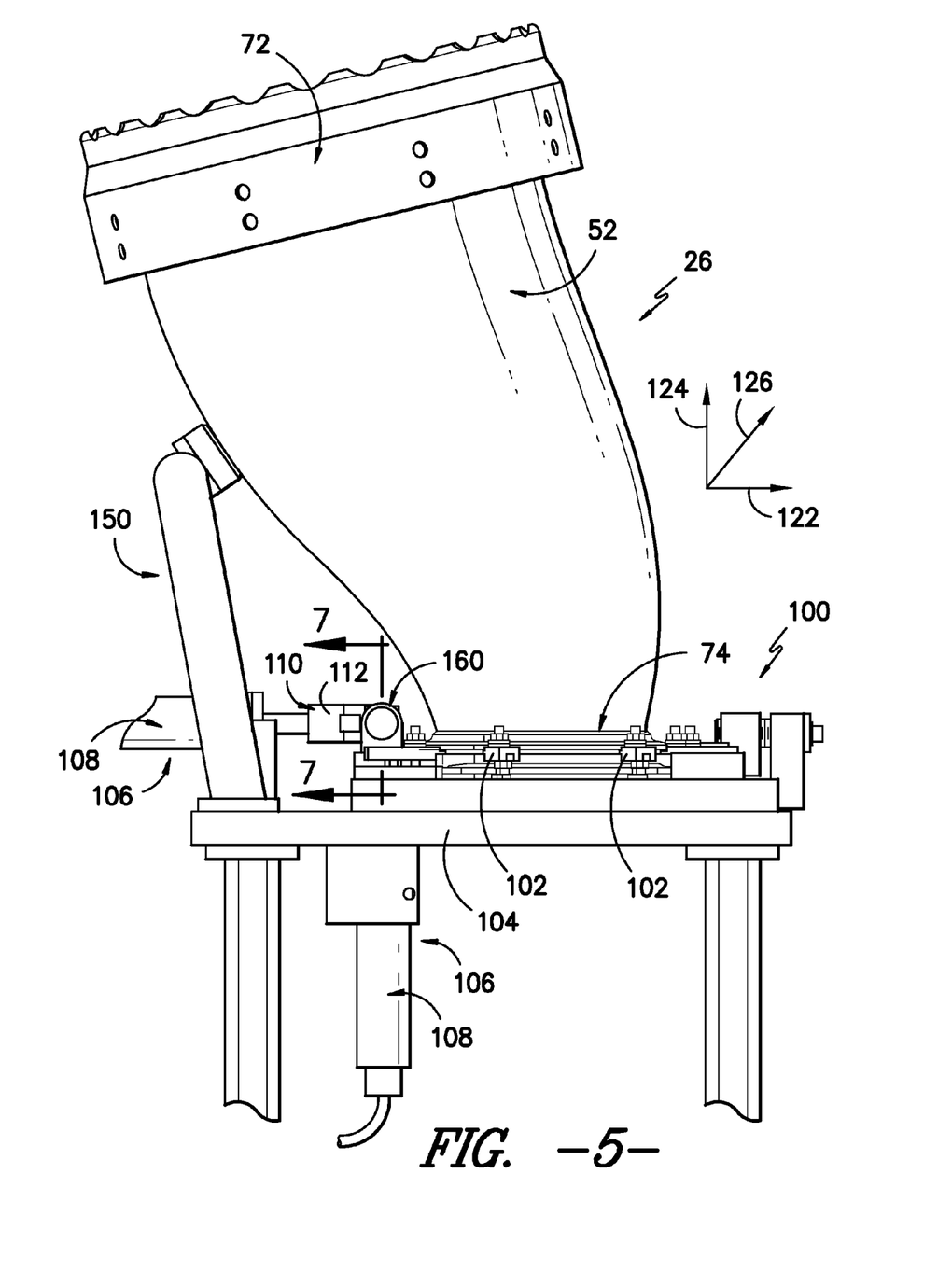
FIG. 5 is a side view of a fixture with a workpiece secured thereon according to one embodiment of the present disclosure.
Figure 6:
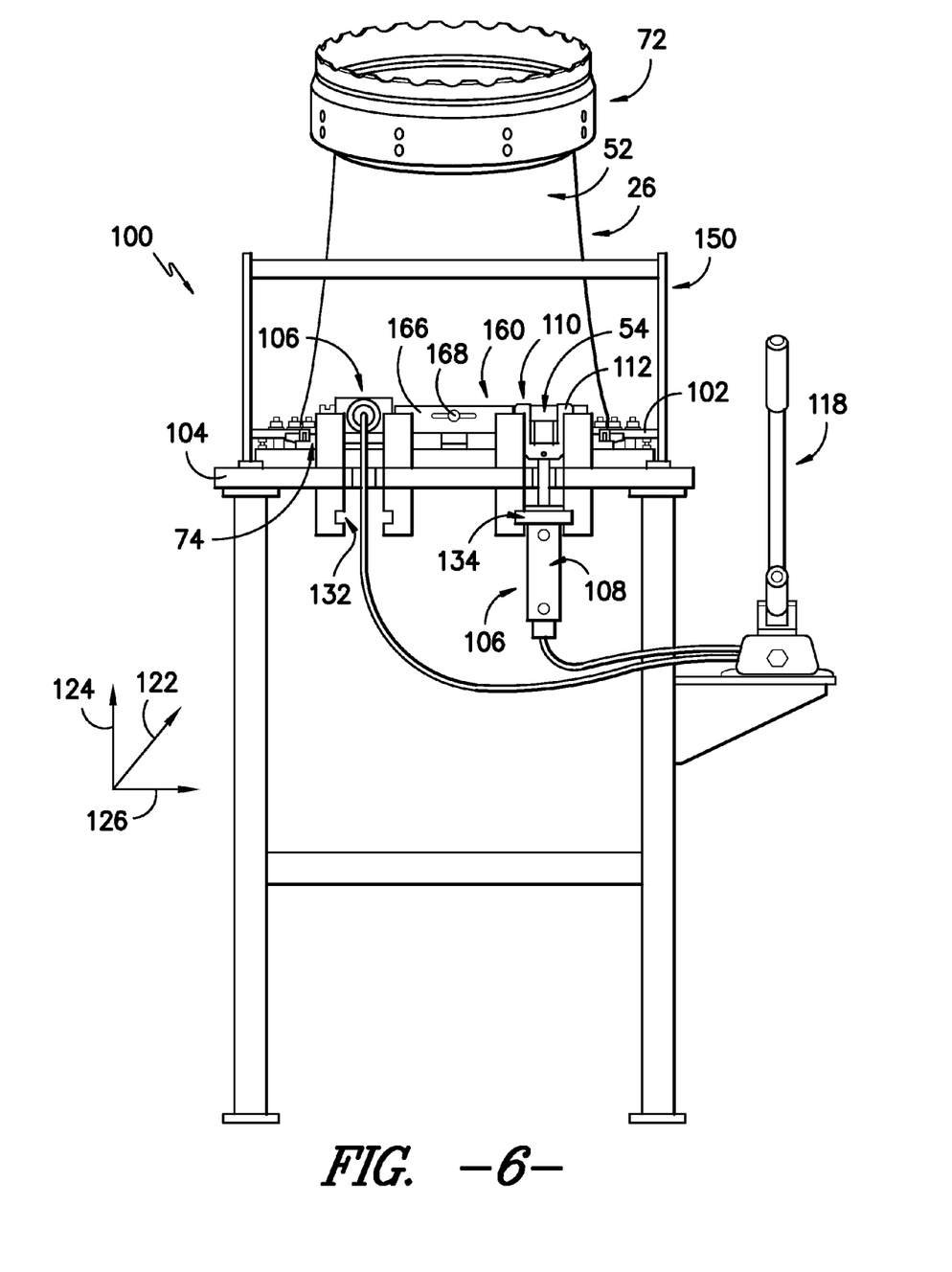
FIG. 6 is a rear view of a fixture with a workpiece secured thereon according to one embodiment of the present disclosure.
Figure 7:
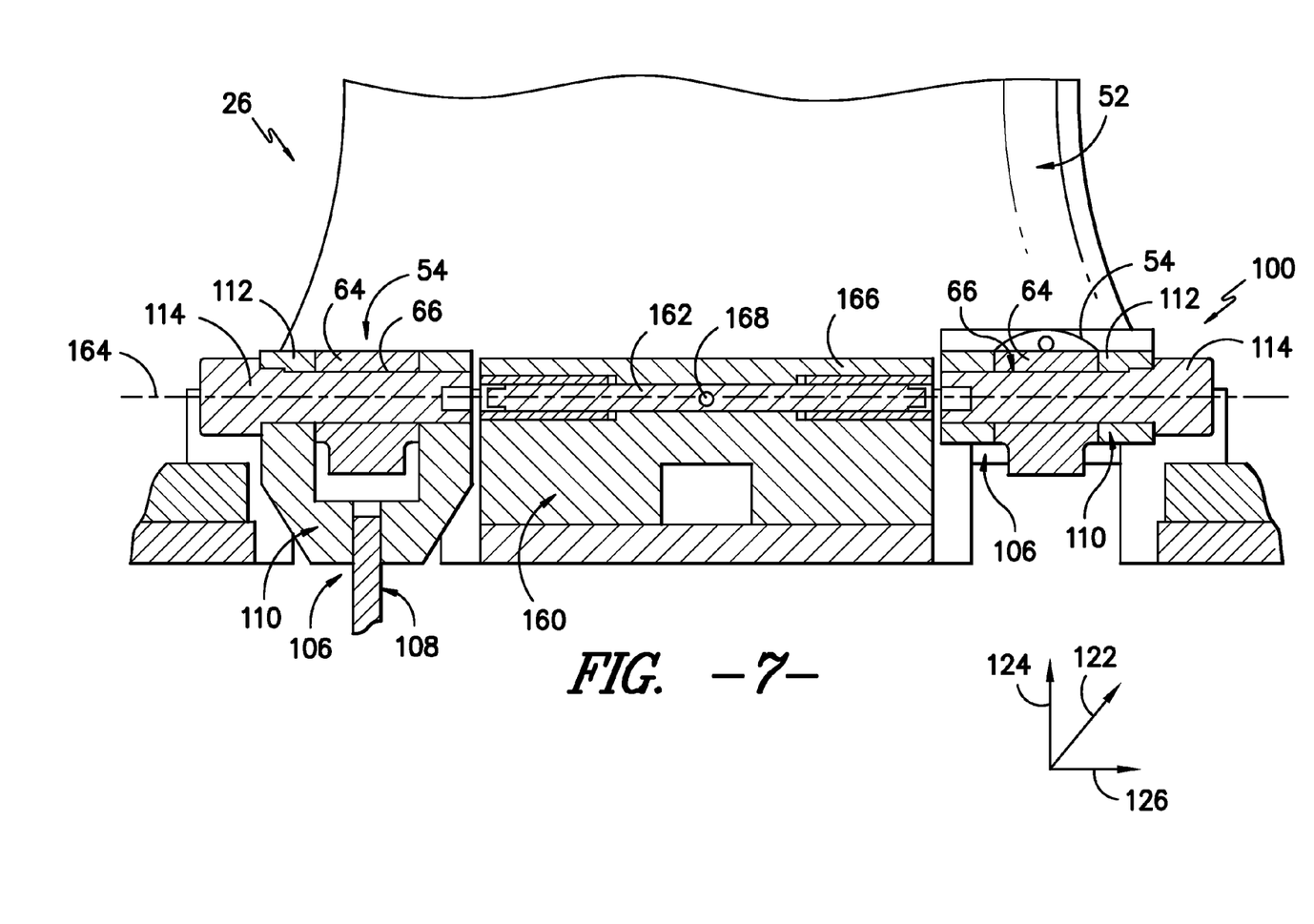
FIG. 7 is a cross-sectional view, along the lines 7-7 of FIG. 5, of a fixture with a workpiece secured thereon according to one embodiment of the present disclosure.

FIGS. 3 and 4 illustrate one embodiment of a workpiece according to the present disclosure. The workpiece in this embodiment is a transition piece 26, which as discussed above is typically utilized in a turbine system 10. It should be understood, however, that the present disclosure is not limited to transition pieces 26. Rather, any suitable workpiece having a projecting member that may require adjustment along two or more axes, as discussed below, is within the scope and spirit of the present disclosure. For example, in the context of turbine systems, a workpiece could be a combustor liner, impingement sleeve, flow sleeve, or other suitable sleeve or liner. The workpiece could in other embodiments be any suitable tubular or non-tubular component for a turbine system or otherwise.

As shown, a workpiece according to the present disclosure includes a body and one or more projecting members. The projecting member projects from the body. In embodiments wherein the workpiece is a transition piece 26, for example, the body is a generally tubular body 52. The projecting members may in exemplary embodiments as shown be mounting brackets 54. Each mounting bracket 54 may mount the transition piece 26 within the combustor section 14 of the turbine system 10. A mounting bracket 54 may include, for example, an arm 62 projecting from the body 52. A lug 64 may be mounted on the arm 62, such as on a distal end thereof as shown. The lug 64 may define a bore hole 66 therethrough. Engagement of the lug 64, such as by extending a bolt, rod, or other suitable apparatus through the bore hole 66, may mount the transition piece 26 within the combustor section 14.

A projecting member according to the present disclosure may be located anywhere on the body of the workpiece. In some embodiments as shown, the projecting member may be located on an end portion of the workpiece. For example, the body of the workpiece may extend between end portions. In embodiments wherein the workpiece is a transition piece, for example, the body 52 may extend between a forward end 72 and an aft frame 74. One or more mounting brackets 54, such as two mounting brackets 54 in embodiments as shown, may project from the aft frame 74.

In many cases, it may be desirable to adjust a projecting member of a workpiece. For example, in many cases, adjustment may be desired in two or more directions along two or more axes. For example, in embodiments wherein the workpiece is a transition piece 26, it may be desirable to adjust one or more mounting brackets 54. Such adjustment may be along one, two, or more axes. Such adjustment may be required for a newly manufactured workpiece, to ensure that the positioning of the projecting member is within the proper specifications, and/or may be required after a period of use of the workpiece, to reposition the projecting member to within the proper specifications.

Thus, the present disclosure is further directed to a fixture 100 for adjusting a workpiece. Embodiments of the fixture 100 are illustrated in FIGS. 5 through 9. As shown and discussed herein, fixtures 100 according to the present disclosure may advantageously be utilized to efficiently and accurately adjust projecting members of workpieces. A fixture 100 according to the present disclosure may thus be capable of securing a workpiece, engaging a projecting member of the workpiece, and moving the projecting member along various axes. The fixture 100 may have the capability of moving the projecting member along at least two axes, if desired or required. Further, in some embodiments, the fixture 100 may further be capable of efficiently and accurately assessing the location of the projecting member, both before and after movement thereof, to confirm accurate position of the projecting member within the proper specifications.

As shown, a fixture 100 according to the present disclosure includes one or more holding devices 102. Each holding device 102 is engageable to the workpiece to secure the workpiece. In exemplary embodiments, a holding device 102 is a clamp, such as a toe clamp as shown. Other suitable clamps include G-clamps, quick action clamps, sash clamps, T-bar clamps, etc. The toe clamp or other suitable clamp may be hydraulically, pneumatically, manually, or otherwise actuatable to engage the workpiece. Further, any suitable device capable of securing the workpiece is within the scope and spirit of the present disclosure. A holding device 102 may engage the workpiece by contacting it, and may secure the workpiece by generally fixing the position of the workpiece in one or more directions along one or more axes.

In some embodiments, a holding device 102 may secure the workpiece within the holding device 102. In other embodiments, as shown, the holding device 102 may secure the workpiece to another component, such as to a table 104 or other suitable base surface. In some embodiments, the table 104 or other suitable base surface may be adjustable, such as height adjustable, through hydraulic, pneumatic, manual, or otherwise actuation thereof.

Figure 8:
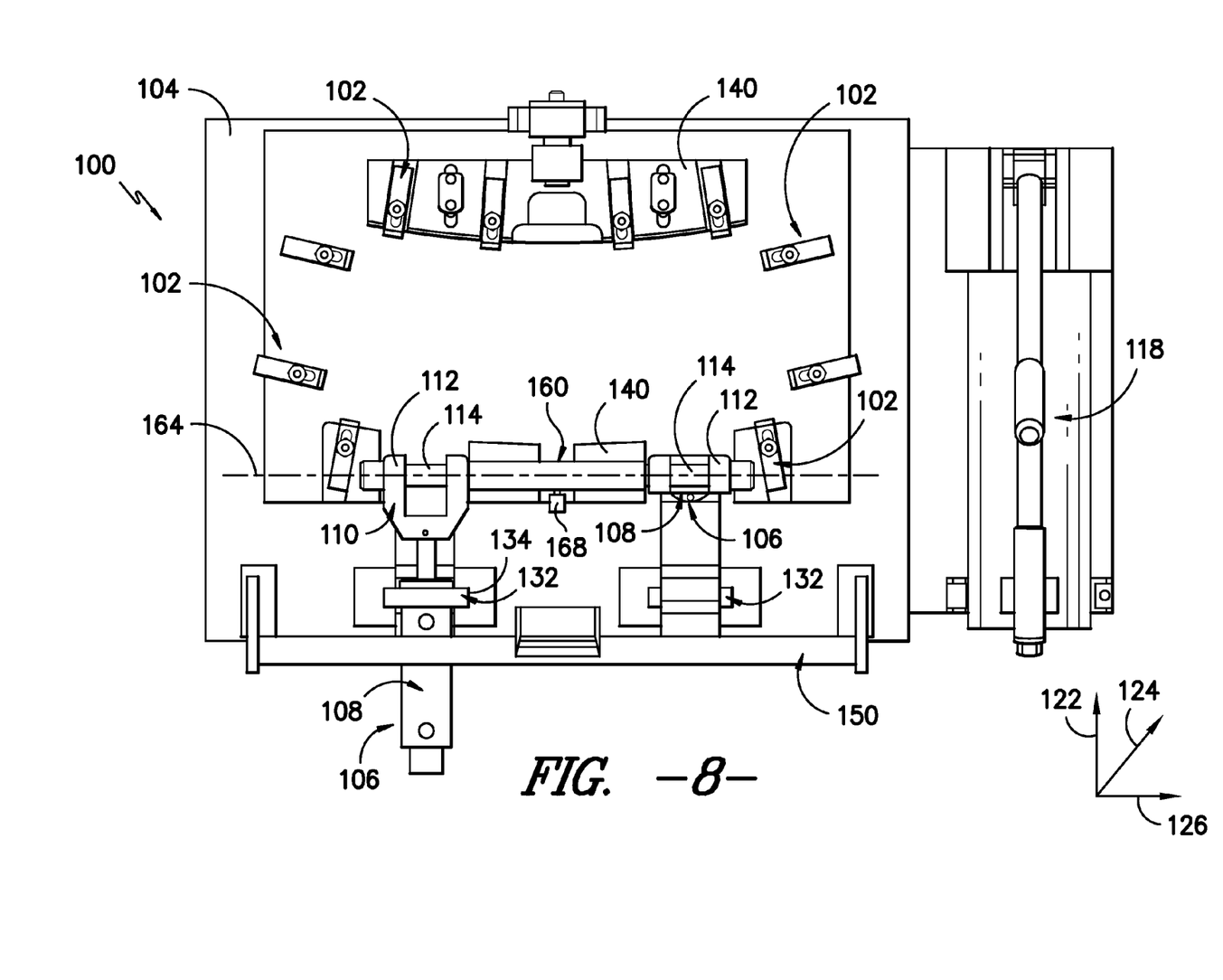
FIG. 8 is a top view of a fixture thereon according to one embodiment of the present disclosure.
Figure 9:
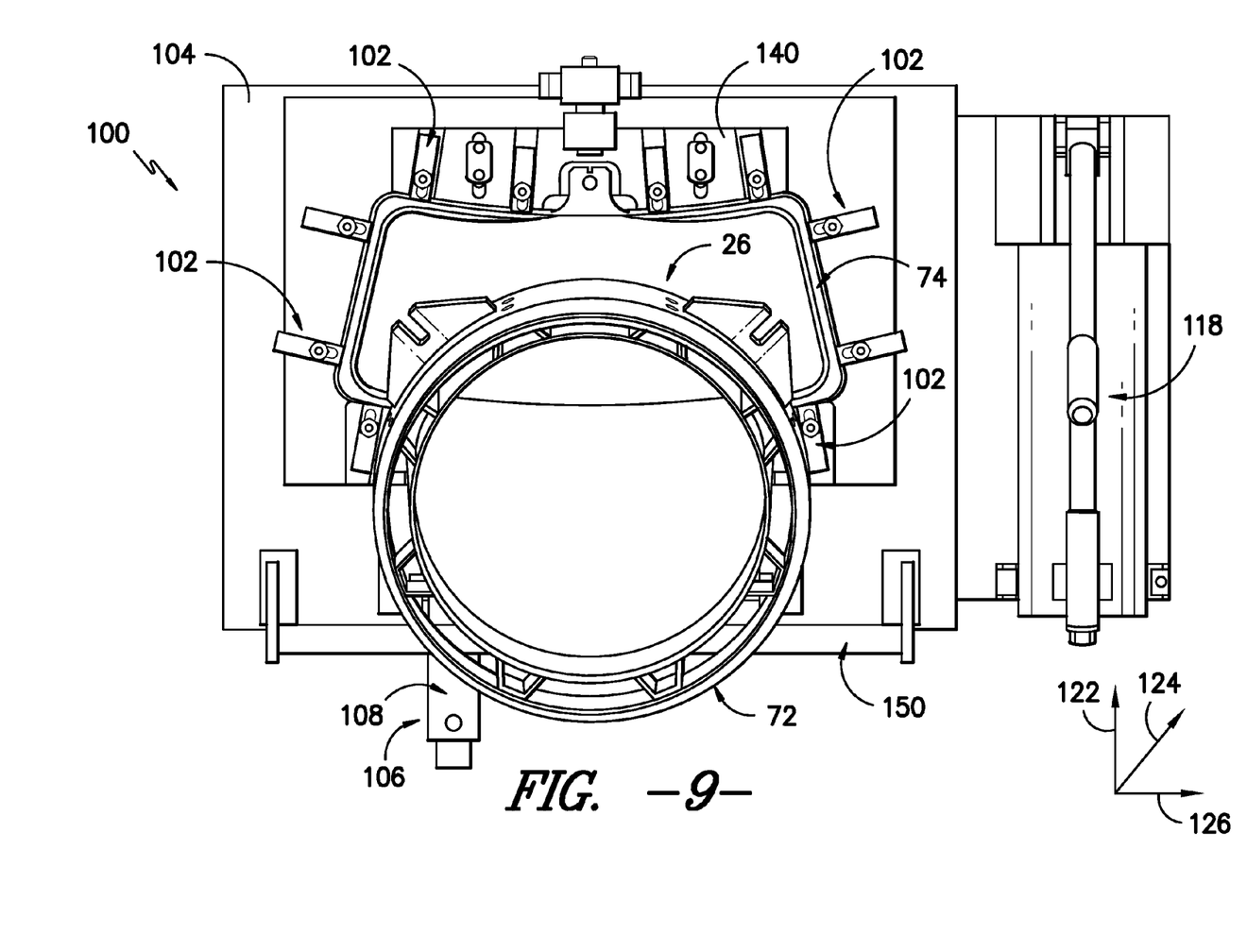
FIG. 9 is a top view of a fixture with a workpiece secured thereon according to one embodiment of the present disclosure.

In exemplary embodiments as shown, holding devices 102 may engage and secure an end portion of a workpiece, such as an aft frame 74 of a transition piece 26 as shown. For example, FIGS. 8 and 9 illustrate eight toe clamps engaging and securing an aft frame 74 to a table 104. It should be understood, however, that any suitable number of holding devices 102 engaging and securing any portion of a workpiece are within the scope and spirit of the present disclosure.

A fixture 100 according to the present disclosure further includes one or more adjustment devices 106. Each adjustment device 106 is engageable to a projecting member of a workpiece. Further, each adjustment device 106 is movable along one or more axes, preferably along at least two axes. Thus, when engaged to a projecting member, movement of an adjustment device along an axis may move the projecting member along this axis. The adjustment device 106 may, as discussed above, move the projecting member along various axes to a location that is within the proper specifications for the workpiece. Such movement to this location through use of an adjustment device 106 advantageously allows such locating of projecting members to be performed accurately and efficiently.

In some embodiments as shown, an adjustment device 106 may include a movable member 108 and an engageable member 110. The engageable member 110 may engage the projecting member by contacting and connecting to the projecting member, such that movement of the adjustment device 106 moves the projecting member. For example, in embodiments wherein the projecting member is a mounting bracket 54 as shown, the engageable member may include a bracket 112 and a pin 114. The bracket 112 may generally surround at least a portion of the mounting bracket 54. The pin 114 may extend through the bore hole 66 in the mounting bracket 54, and further through bore holes 116 in the bracket 112, to engage the mounting bracket 54. In other embodiments, the engageable member may include a clamp, hook, or other suitable apparatus for engaging a projecting member, such as a mounting bracket 112 as shown.

The movable member 108 may move along one or more axes such that, when engaged to a projecting member, the movable member 108 moves the projecting member along these axes. In exemplary embodiments as shown, a movable member 108 is a hydraulic cylinder. In alternative embodiments, the movable member 108 may be a pneumatic cylinder, a mechanical gear assembly, or any other suitable movable apparatus. The movable member 108 may further be connected to an actuator, such as a pump assembly 118, motor, or other suitable actuation device that faciliates movement of the movable member 108.

FIGS. 5 through 9 each illustrate fixtures having two adjustment devices 106. Each adjustment device 106 is movable along two axes. For example, one adjustment device 106 is shown movable along an x-axis 122, while the other adjustment device 106 is shown movable along a z-axis 124. It should be understood that an adjustment device 106 according to the present disclosure may further be movable along a y-axis 126.

Further, each adjustment device 106 as shown is pivotable between a first position wherein the adjustment device 106 is movable along a first axis and a second position wherein the adjustment device 106 is movable along a second axis. For example, as shown, each adjustment device 106 is pivotable between a first position wherein the adjustment device 106 is movable along the x-axis 122 and a second position wherein the adjustment device 106 is movable along the z-axis 124. The entire adjustment device 106 may pivot, or in some embodiments just the movable member 108 may pivot. Retaining slots 132 may retain the adjustment device 106 in position to move along each axis. For example, two retaining slots 132 may be included in the fixture 100 as shown, and may for example be mounted to the table 104, for each adjustment device 106 to retain that adjustment device 106 in the first position and the second position. Retaining protrusions 34 extending from the adjustment devices 106 may couple with the slots 132 as shown to provide such retention. Thus, the adjustment devices 106 may move along multiple axes to move projecting members along these axes. It should be understood that an adjustment device 106 may be pivotable or otherwise shiftable between any one or more axes.

A fixture 100 according to the present disclosure can thus secure a workpiece and move a projecting member thereof. In some embodiments, the projecting member may be moved with respect to other fixed portions of the fixture 100, such as end portions. In embodiments wherein the workpiece is a transition piece 26, for example, the mounting brackets 54 may be movable with respect to the aft frame 74, which may be fixed. This allows locating of the mounting brackets 54 with respect to the aft frame 74 and within proper specifications such that the transition piece 26 can be properly mounted in a turbine system 10.

In some embodiments, further components may be included in the fixture for locating the workpiece and various components thereof. For example, locating plates 140 may be included, such as on the table 104 as shown. The locating plates 140 may be shaped to correspond to the shapes of various components of the workpiece, to properly position the workpiece. For example, locating plates 140 may properly position an end portion, such as an aft frame 74, as shown. Such locating features ensure that when the projecting members are moved to proper locations, these locations are both within specifications and proper with respect to the other components of the workpiece. Holding devices 102 may additionally locate the workpiece within the fixture, as shown.

Additional components may be provided in the fixture for engaging the workpiece. For example, a support arm 150 may be provided, such as mounted to the table 104. A portion of the workpiece may be supported by the support arm 150 when positioned in the fixture.

In exemplary embodiments, adjustment of the projecting members may be performed at ambient conditions. Thus, in embodiments wherein the workpiece is a metal or metal alloy, the fixture may cold work the workpiece. In other embodiments, however, the workpiece could be heated before or during adjusting thereof, and suitable heating apparatus may be provided for such heating.

In some embodiments, a fixture 100 according to the present disclosure may further include apparatus for assessing the location of the projecting members. For example, a locating device 160 may be provided. The locating device 160 may be configured to assess a location of the projecting member. The locating device 160 may thus determine whether the location of the projecting member is desirable, such as within the proper specifications, or whether adjustment along one or more axes is necessary to properly locate the projecting member. As shown, for example, a locating device 160 may include a pin 162 slidable along a locating axis 164. The pin 162 may be housed in a housing 166, and a handle 168 on the pin 168 may be utilized to move the pin 162 along the axis 164. When the projecting member is appropriately located, the pin 162 may slide along the axis 164 to engage the projecting member in a certain fashion. For example, in embodiments wherein the projecting member is a mounting bracket 54, the pin 162 may slide into the bore hole 66 when the mounting bracket 54 is properly located. If the pin 162 does not slide into the bore hole 66, this may indicate that further adjustment of the mounting bracket 54, such as along one or more axes, is required. In other embodiments, the pin 162 may enter, contact, or otherwise engage the projecting member to assess the location of the projecting member.

In other embodiments, any suitable apparatus may be utilized to locate and assess the location of a projecting member. For example, various gauges or other suitable measurement apparatus may be included in the fixture to assess the location of the projecting member and the workpiece in general.

The present disclosure is further directed to methods for adjusting workpieces. A method may include, for example, securing a workpiece such that the workpiece is generally fixed. In some embodiments, for example, the workpiece may be a transition piece 26. Further, in some embodiments, the workpiece may be secured such that an end portion, such as an aft frame 74 of a transition piece 26, is fixed. In some embodiments, as discussed above, a holding device 102 may be utilized to engage and secure the workpiece.

A method according to the present disclosure may further include engaging a projecting member of the workpiece with an adjustment device. In some embodiments the projecting member may be, for example, a mounting bracket 54 of a transition piece 26.

A method according to the present disclosure may further include moving the adjustment device 106 along at least one axis. The adjustment device 106 in exemplary embodiments is capable of movement along two or more axes, such as along an x-axis 122 and a z-axis 124, as discussed above. Movement of the adjustment device 106 may move, and thus adjust, the engaged projecting member along the axis of movement. Movement of the adjustment device 106 along more than one axis may be required or desired to adjust the projecting member along each of these axes. Thus, in some embodiments, a method may further include pivoting the adjustment device between a first position and a second position. In the first position, the adjustment device 106 is movable along a first axis, such as an x-axis 122 or a z-axis 124, while in the second position, the adjustment device 106 is movable along a second axis, such as the other of the x-axis 122 or the z-axis 124. As discussed, such movement may adjust the engaged projecting member along these axes.

In some embodiments, the method may further include assessing a location of the projecting member. Such assessment may be performed before, during, and/or after moving the adjustment device 106. Assessment of the location of the projection member can, for example, determine whether the location of the projecting member is within the appropriate specifications. Such location may be relative to, for example, the workpiece in general or a specification component of the workpiece, such as an end portion. In some embodiments, assessment may be performed by a locating device 160, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fixture for adjusting a transition piece, the fixture comprising:
   a holding device engageable to the transition piece to secure the transition piece; and
   an adjustment device engageable in contact with a mounting bracket connected to and projecting from a body of the transition piece and movable along a first axis and a second axis,
   wherein movement of the adjustment device along the first axis when engaged to the mounting bracket adjusts the mounting bracket along the first axis relative to an aft frame of the transition piece, and wherein movement of the adjustment device along the second axis when engaged to the mounting bracket adjusts the mounting bracket along the second axis relative to the aft frame.

2. The fixture of claim 1, wherein the adjustment device comprises a movable member and an engageable member.

3. The fixture of claim 2, wherein the movable member is a hydraulic cylinder.

4. The fixture of claim 2, wherein the engageable member comprises a bracket and a pin, the pin extendable through the mounting bracket and the bracket to engage the mounting bracket.

5. The fixture of claim 1, wherein the adjustment device is pivotable between a first position wherein the adjustment device is movable along the first axis and a second position wherein the adjustment device is movable along the second axis.

6. The fixture of claim 1, further comprising a locating device configured to assess a location of the mounting bracket.

7. The fixture of claim 1, wherein the holding device is a clamp.

8. The fixture of claim 1, wherein the holding device is engageable to the aft frame of the transition piece.

9. The fixture of claim 1, wherein the first axis is an x-axis and the second axis is a z-axis.

10. A fixture for adjusting a workpiece, the fixture comprising:
- a holding device engageable to a workpiece to secure the workpiece; and
- an adjustment device engageable to a projecting member connected to and projecting from a body of the workpiece and movable along a first axis and a second axis, wherein movement of the adjustment device along the first axis when engaged to the projecting member adjusts the projecting member along the first axis relative to the body, and wherein movement of the adjustment device along the second axis when engaged to the projecting member adjusts the projecting member along the second axis relative to the body.

11. The fixture of claim 10, wherein the adjustment device comprises a movable member and an engageable member.

12. The fixture of claim 10, wherein the adjustment device is pivotable between a first position wherein the adjustment device is movable along the first axis and a second position wherein the adjustment device is movable along the second axis.

13. The fixture of claim 10, further comprising a locating device configured to assess a location of the projecting member.

14. The fixture of claim 10, wherein the holding device is a clamp.

15. The fixture of claim 10, wherein the holding device is engageable to an end portion of the workpiece.

16. The fixture of claim 10, wherein the first axis is an x-axis and the second axis is a z-axis.

17. The fixture of claim 10, wherein the workpiece is a transition piece and the projecting member is a mounting bracket of the transition piece.

18. A method for adjusting a workpiece, the method comprising:
- securing the workpiece such that the workpiece is generally fixed;
- engaging a projecting member of the workpiece with an adjustment device, the projecting member connected to and projecting from a body of the workpiece;
- moving the adjustment device relative to the body at least one of a first axis or a second axis to adjust the projecting member relative to the body along the at least one of the first axis or the second axis.

19. The method of claim 18, further comprising assessing a location of the projecting member.

20. The method of claim 18, further comprising pivoting the adjustment device between a first position wherein the adjustment device is movable along the first axis and a second position wherein the adjustment device is movable along the second axis.

* * * * *